(12) United States Patent
Sayyadi et al.

(10) Patent No.: US 8,142,286 B2
(45) Date of Patent: Mar. 27, 2012

(54) PROGRAMMABLE MOVEMENT OF AN ORIENTATION OF A GAME CHARACTER VIEW OF A GAME ENVIRONMENT

(75) Inventors: Babak Sayyadi, Bellevue, WA (US); Sarah J. Fuelling, Seattle, WA (US); Devon L. Ellis, Lacey, WA (US); Daniel M. Sangster, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 11/893,881

(22) Filed: Aug. 17, 2007

(65) Prior Publication Data

US 2009/0048018 A1 Feb. 19, 2009

(51) Int. Cl.
*A63F 9/24* (2006.01)
*A63F 13/00* (2006.01)

(52) U.S. Cl. .............. 463/37; 463/36; 463/38; 463/43

(58) Field of Classification Search .............. 463/30–33, 463/36–38
See application file for complete search history.

(56) References Cited

U.S. PATENT DOCUMENTS

| | | | | |
|---|---|---|---|---|
| 5,929,844 A * | 7/1999 | Barnes | .......................... | 345/156 |
| 5,993,318 A * | 11/1999 | Kousaki | .......................... | 463/35 |
| 6,068,554 A * | 5/2000 | Tyler | .......................... | 463/38 |
| 6,126,547 A * | 10/2000 | Ishimoto | .......................... | 463/42 |
| 6,139,433 A * | 10/2000 | Miyamoto et al. | .............. | 463/32 |
| 6,139,434 A * | 10/2000 | Miyamoto et al. | .............. | 463/32 |
| 6,155,926 A * | 12/2000 | Miyamoto et al. | .............. | 463/32 |
| 6,196,919 B1 * | 3/2001 | Okubo | .......................... | 463/32 |
| 6,213,880 B1 | 4/2001 | Sim | .......................... | 463/37 |
| 6,273,818 B1 * | 8/2001 | Komoto | .......................... | 463/31 |
| 6,280,323 B1 | 8/2001 | Yamazaki et al. | .............. | 463/4 |
| 6,392,676 B1 | 5/2002 | Mori et al. | .......................... | 345/861 |
| 6,413,163 B1 * | 7/2002 | Yamauchi et al. | .............. | 463/31 |
| 6,445,364 B2 | 9/2002 | Zwern | .......................... | 345/8 |
| 6,532,001 B1 | 3/2003 | Taraki et al. | .............. | 345/163 |
| 6,749,514 B1 * | 6/2004 | Moriwaki et al. | .............. | 463/43 |
| 7,075,516 B2 | 7/2006 | Bohn | .......................... | 345/163 |
| 7,079,110 B2 | 7/2006 | Ledbetter et al. | .............. | 345/156 |
| 7,187,362 B2 | 3/2007 | Liang | .......................... | 345/163 |
| 7,235,012 B2 * | 6/2007 | DiDato | .......................... | 463/38 |
| 7,242,408 B1 | 7/2007 | Dunn | .......................... | 345/582 |
| 7,455,589 B2 * | 11/2008 | Neveu et al. | .......................... | 463/37 |
| 7,806,767 B2 * | 10/2010 | Kitao | .......................... | 463/31 |
| 2003/0058219 A1 | 3/2003 | Shaw | .......................... | 345/161 |

(Continued)

OTHER PUBLICATIONS

RAZER™ DIAMONDBACK 198 1600dpi, Salamander Red, Inter-Logic 2005-2006.

(Continued)

*Primary Examiner* — Melba Bumgarner
*Assistant Examiner* — Steven J Hylinski
(74) *Attorney, Agent, or Firm* — Westman Champlin & Kelly, P.A.

(57) ABSTRACT

A control system comprises a control device comprising a programmable macro button, a memory containing view change settings, a driver program and a microprocessor. The driver program includes a view change output that is produced in response to actuation of the macro button and is based on the view change settings. The microprocessor is configured to move the orientation of the character view of the game environment from a beginning orientation to an ending orientation in response to the view change output. Also disclosed is a method of using a control system to move an orientation of a character view of a game environment in a video game.

19 Claims, 9 Drawing Sheets

U.S. PATENT DOCUMENTS

| | | | |
|---|---|---|---|
| 2003/0100366 A1* | 5/2003 | Nagase | 463/33 |
| 2003/0224332 A1 | 12/2003 | Trachuk | 434/11 |
| 2004/0077393 A1 | 4/2004 | Kim et al. | 463/2 |
| 2004/0209684 A1* | 10/2004 | Hisano | 463/32 |
| 2005/0014561 A1* | 1/2005 | Ouchi | 463/36 |
| 2005/0215321 A1 | 9/2005 | Hussaini et al. | 463/37 |
| 2005/0225531 A1 | 10/2005 | Cheng | 345/163 |
| 2006/0040740 A1* | 2/2006 | DiDato | 463/37 |
| 2006/0095862 A1 | 5/2006 | Munoz-Bustamante | 715/784 |
| 2006/0178179 A1 | 8/2006 | Neveu et al. | 463/5 |
| 2006/0281511 A1* | 12/2006 | Holm et al. | 463/9 |
| 2007/0097076 A1 | 5/2007 | Gross | 345/163 |
| 2007/0218995 A1* | 9/2007 | Didato | 463/37 |
| 2008/0070684 A1* | 3/2008 | Haigh-Hutchinson | 463/32 |

OTHER PUBLICATIONS

Logitech® MX™ 518 Gaming-Grade™ Optical Mouse, P/N 931352-0403, Logitech, 2007.

Microsoft Habu Gaming Mouse, Techgage Networks Inc., 2005-2006.

International Search Report and Written Opinion of PCT/US2008/72919 filed Aug. 12, 2008.

* cited by examiner

PROGRAMMABLE MOVEMENT OF AN ORIENTATION OF A GAME CHARACTER VIEW OF A GAME ENVIRONMENT

BACKGROUND

Embodiments are directed to systems and methods for controlling a game character in a video game using a control device and, more particularly, to systems and methods that allow a player to define a desired operator controlled movement of the game character and assign the defined movement to a macro button of the control device.

Control devices, such as computer mice, keyboards and game controllers, are used for controlling game characters in video games. Some video games provide pre-programmed actions such as a punch or kick, a glance in a rear-view mirror of a race car, etc., that are pre-assigned to a particular button of the control device by the video game application. It is not necessary for the operator of the controller to do anything more than press the assigned button to execute these preprogrammed moves.

Other game character movements are not preprogrammed and are continuously adjustable using the controller. These non-programmed movements generally include the orientation of the game character's view of the game environment and the direction and speed in which the game character moves.

The orientation of the game character's view of the game environment can generally be moved left, right, up or down. In some games, the player must constantly be moving the orientation of a game character's view. For instance, in a fast paced first-person shooter game, the player is often forced to move the game character's view continuously to locate predatory characters that may be to the side or behind the game character.

There is continuous need for more efficient game controls, particularly as the complexity of the controls and the speed of game play increases.

The discussion above is merely provided for general background information and is not intended to be used as an aid in determining the scope of the claimed subject matter.

SUMMARY

Embodiments are generally directed to control systems and methods for allowing a player to calibrate a desired operator-controlled movement of an orientation of a character view of a game character of a game environment and assign the calibrated movement to a macro button of a control device. One embodiment of the control system comprises a control device comprising a programmable macro button, a memory containing view change settings, a driver program and a microprocessor. The driver program includes a view change output that is produced in response to actuation of the macro button and is based on the view change settings. The microprocessor is configured to move the orientation of the character view of the game environment from a beginning orientation to an ending orientation in response to the view change output.

In one embodiment of the method, a view orientation move is calibrated comprising storing view change settings in memory. A view change output is produced in response to actuation of a macro button of a control device. The orientation of the character view of the game environment is then moved from a beginning orientation to an ending orientation based on the view change settings in response to the view change output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
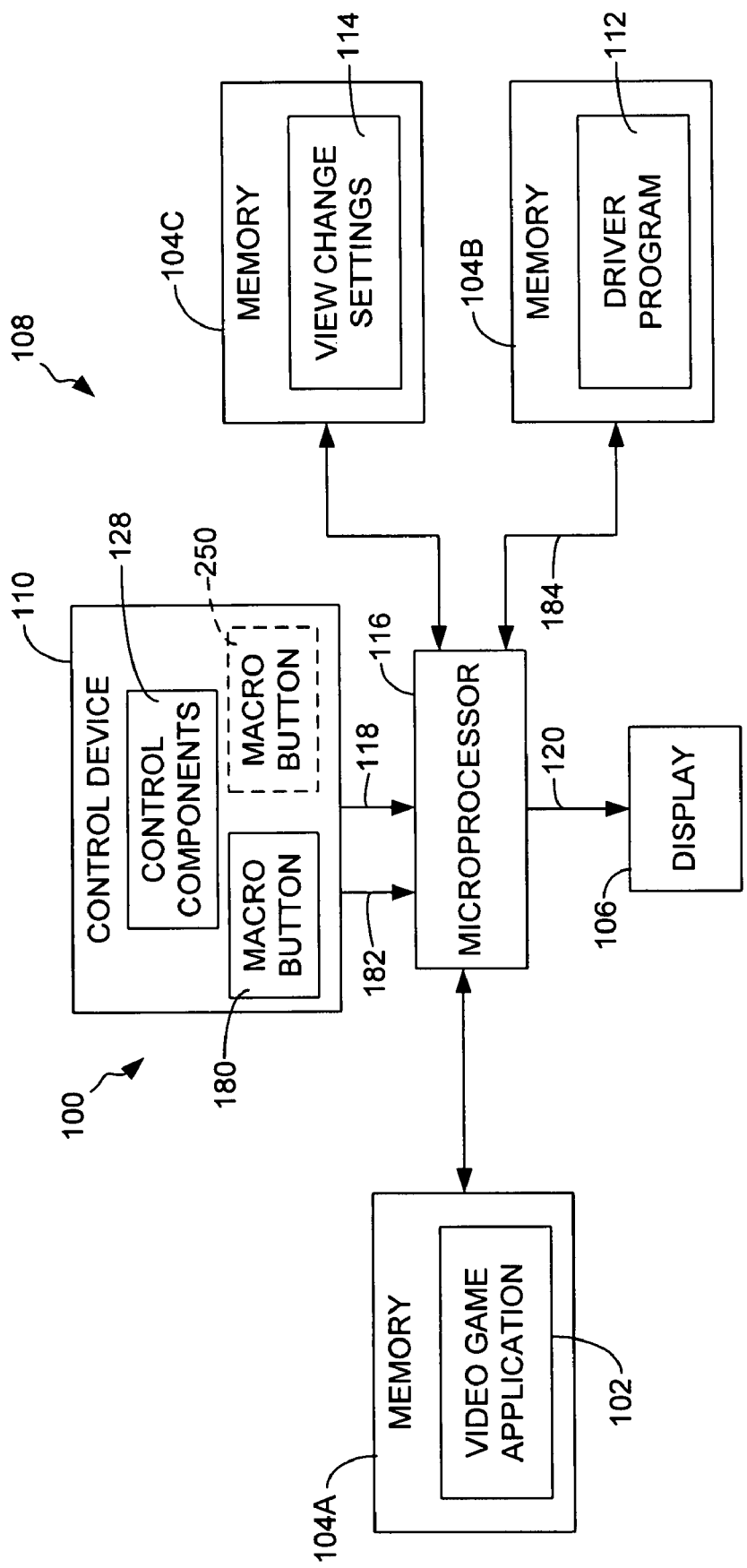
FIG. 1 is a simplified block diagram of an exemplary game system in accordance with embodiments.

FIG. 1 is a simplified block diagram of an exemplary game system 100 in accordance with embodiments. The game system comprises a video game application 102 stored in memory 104A, a display 106 and a control system 108. The control system 108 includes a control device 110, a driver program 112 stored in memory 104B, view change settings 114 stored in memory 104C and a microprocessor or central processing unit 116.

The microprocessor 116 represents one or more devices that are configured to control the operations of the game system 100 and the control system 108. The microprocessor 116 may be a component of a personal computer, a game console (e.g., Xbox 360) or other computing device. Exemplary operations that could be performed by the microprocessor 116 include data communications in the system 100 including data communications with accessible memory of the system, such as memory 104A, 104B and 104C; network data communications; responses to input signals 118 received from one or more of the control devices 110; the execution of instructions stored on a tangible medium, such as the instructions of the video game application 102 and the driver program 112; the generation of output signals that control one or more output devices, such as a display signal 120 that controls the display 106; and other functions.

The memories 104A-C represent physical storage mediums that can be separate from each other or combined. The physical storage mediums 104A-C can take on many different forms, such as CD-ROM's, digital versatile disks (DVD) or other optical disk storage media, flash memory drives, hard drives, RAM, ROM, EEPROM, magnetic cassettes, magnetic tape, magnetic disk storage or other magnetic storage devices, or any other medium which can be used to store the desired video game application 102, driver program 112 and the view change settings 114.

The control device 110 may be any suitable input device to the control system 108 for controlling operations of a game character within the game environment of the video game. Embodiments of the control device 110 include a computer mouse 122, a game controller (i.e., a control device that is generally dedicated to gaming) 124 and a keyboard 126, which are respectively illustrated in FIGS. 2-4. The control device 110 includes control components 128 (FIG. 1) that, when actuated, generate the input signals 118. The driver program 112 translates the input signals 118 into information that is used by the video game application 102 under the control of the microprocessor 116 to produce an action within the video game, such as movement of the game character or other action.

Exemplary control components 128 of the mouse 122 include buttons 132, a scroll wheel 134, the mechanical or optical components (not shown) that translate lateral or side-to-side movement of the mouse into movement of the game character, and other components. Exemplary control components 128 of the game controller 124 include buttons 136, a directional pad 138, a joystick 140, finger triggers (not shown) and other components. Exemplary control components 128 of the keyboard 126 include the keys 142, such as the arrow keys 142A-D, and other components.

As discussed above, the video game application 102 assigns predefined actions to the control components 128 of the control device 110. The actuation of some of the control components 128 results in the execution of the predefined action of the game character, such as a jump or a kick, for example. Other movements of the game character in response to actuation of some of the control components 128 include operator or player controlled movements that do not fall into this predefined action category, such as the orientation of the game character's view and the direction and speed at which the game character travels.

The video game application 102 can comprise any game in which embodiments are useful. Exemplary video games include first-person games (e.g., Halo®, racing games), in which the display 106 presents the player (i.e., the operator of the control device) a view of the game environment as seen by the game character (i.e., human, creature, mechanical device, etc.) he or she controls, and third-person games (e.g., role playing games such as Dungeon Siege® II), in which the display 106 presents a distant view of the game character within the game environment. Whether the video game provides a first-person display of the game environment or a third-person display of the game environment, the game character has a view (hereinafter "character view"), which has a particular orientation.

Figure 5:
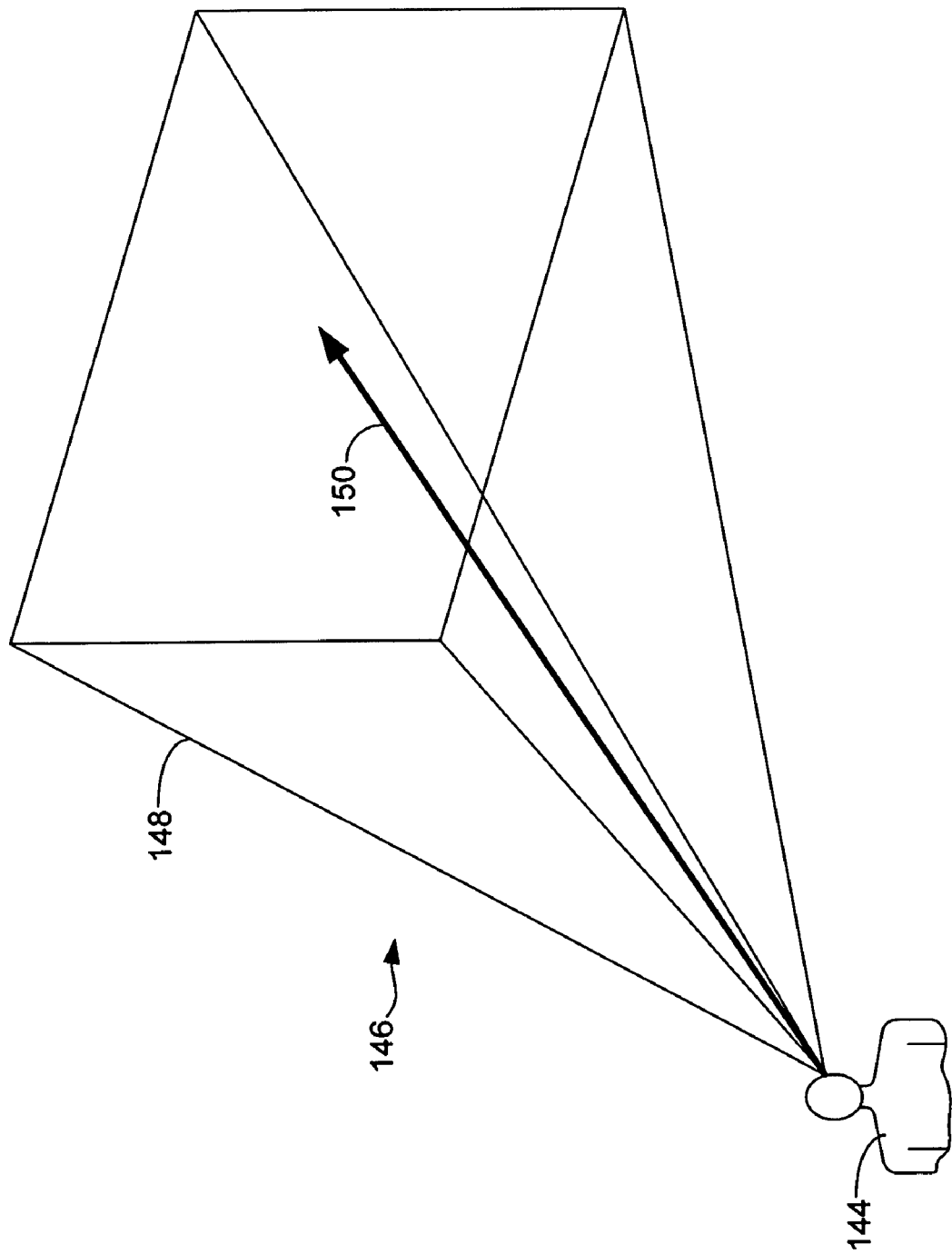
FIG. 5 illustrates an exemplary view of a portion of a game character within a game environment.

FIG. 5 illustrates an exemplary view of a portion of a game character 144 within a game environment 146 as produced by the execution of the video game application 102. When the game application 102 produces a first-person video game, the display 106 presents the view of the game environment 146 as seen by the game character 144, which is represented by the projection 148. Objects within the projection 148 that are viewable to the game character 144 are provided on the display 106 of the game system 100. Thus, the orientation of the character view 144 determines what the player sees on the display 106.

When the video game application 102 produces a third-person game, the display 106 presents the game character 144 (only a portion shown) and the surrounding game environment 146. The third-person game character 144 has a "view" of the game environment corresponding to the orientation of the game character's "head" or "eyes", for example. Thus, movements of the head of the third-person game character 144 results in a movement of the orientation of the game character view.

The movement of the orientation of the third-person game character view can be important in, for example, role playing games where the game character 144 can interact with other objects and inhabitants of the game environment 146. Typically, the interaction between the game character 144 and an object or inhabitant of the game environment 146 is driven, in part, by the orientation of the character view or where the game character is "looking".

As mentioned above, the orientation of the first-person or third-person character view of the game environment 146, represented by the arrow 150 in FIG. 5, can generally be moved using one of the control components 128 of the control device 110. In most games, the orientation 150 of the character view can rotate about a vertical axis 152 in clockwise and counterclockwise directions, as indicated by the arrow 154 shown in the simplified top plan view of the game character 144 in FIG. 6. Thus, the orientation 150 may move from a starting orientation 156 to an ending orientation 158 by rotating the orientation 150 about the vertical axis 152 in the counterclockwise direction indicated by arrow 160, or the clockwise direction.

Figure 6:
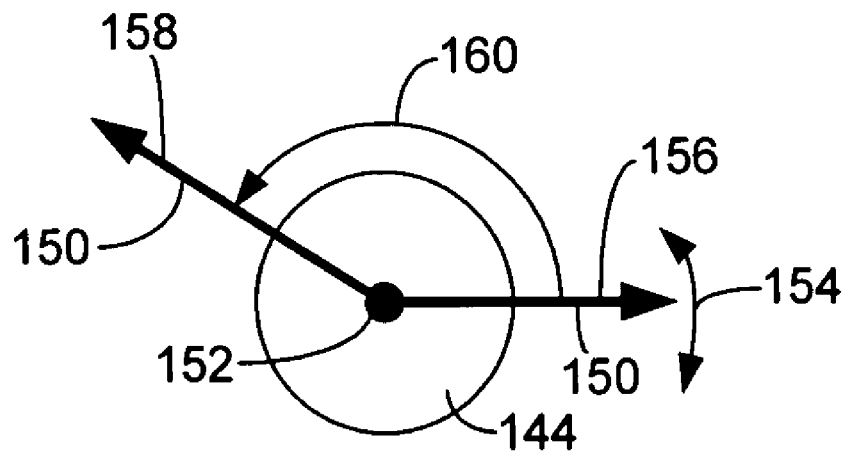
FIG. 6 is a simplified top plan view of a game character illustrating movement of an orientation of a character view about a vertical axis.
Figure 7:
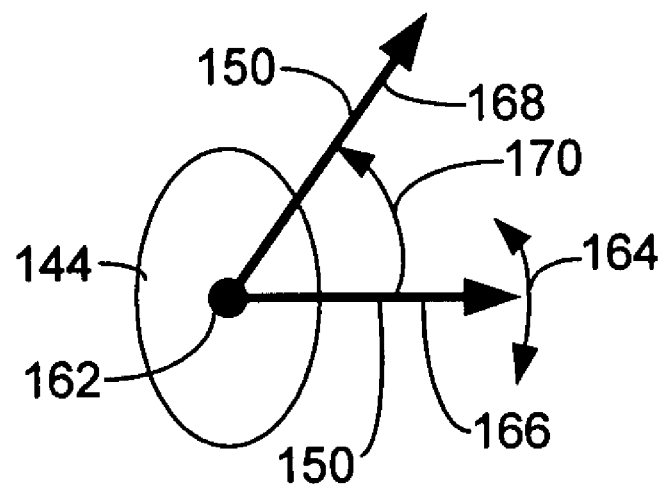
FIG. 7 is a simplified top plan view of a game character illustrating movement of an orientation of a character view about a horizontal axis.

Additionally, the orientation 150 of the character view may also pivot upward and downward about an axis 162, as represented by the arrow 164 in the simplified side view of the game character 144 shown in FIG. 7. Thus, the orientation 150 may move from a starting orientation 166 to an ending orientation 168 by pivoting the orientation 150 about the vertical axis 152 in the upward direction indicated by arrow 170, as shown in FIG. 6.

The movements of the orientation 150 of the character view may also include both the rotation about the vertical axis 152 and the pivoting about the axis 162 in response to the actuation of one or more of the control components 128 of the device 110.

Figure 2:
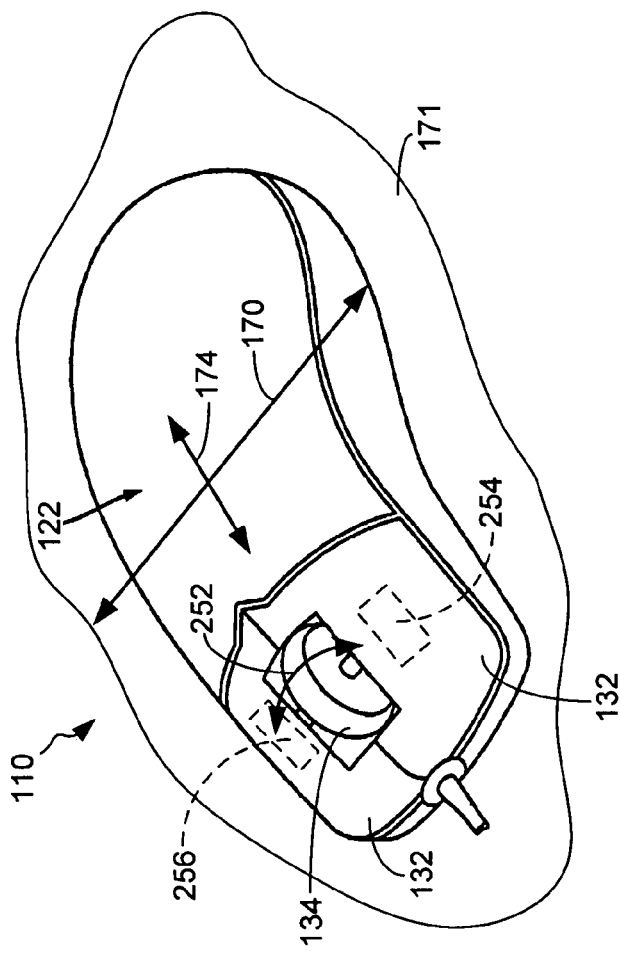
FIG. 2 is a perspective view of a computer mouse in accordance with embodiments.

When the control device 110 is a computer mouse, such as mouse 122 shown in FIG. 2, the orientation 150 of the game character's view can be rotated about the vertical axis 152 and/or pivoted up or down about the axis 162 in response to movements of the mouse across a surface 171. For instance, movement of the mouse 122 across the surface 171 in the directions indicated by arrow 172 can cause the orientation of the character view to rotate about the axis 152 in either a clockwise or counterclockwise direction. Similarly, movement of the mouse 122 across the surface 171 in the direction indicated by arrow 174 can cause the orientation 150 of the character view to pivot upward or downward.

Figure 3:
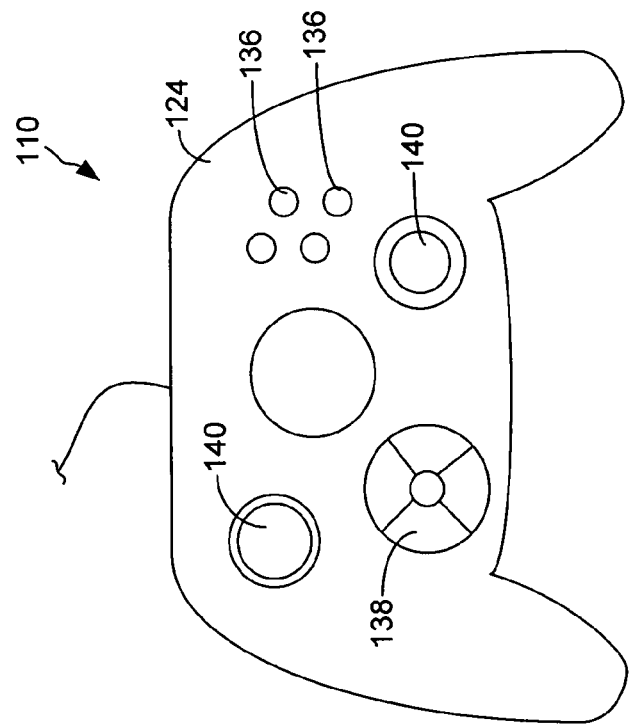
FIG. 3 is a simplified top plan view of a game controller in accordance with embodiments.

When the controller is a game controller, such as game controller 124 shown in FIG. 3, the up, down, clockwise and counterclockwise movements of the orientation of the character view are typically performed in response to movements of the directional pad 138 or the joystick 140, for example.

Figure 4:
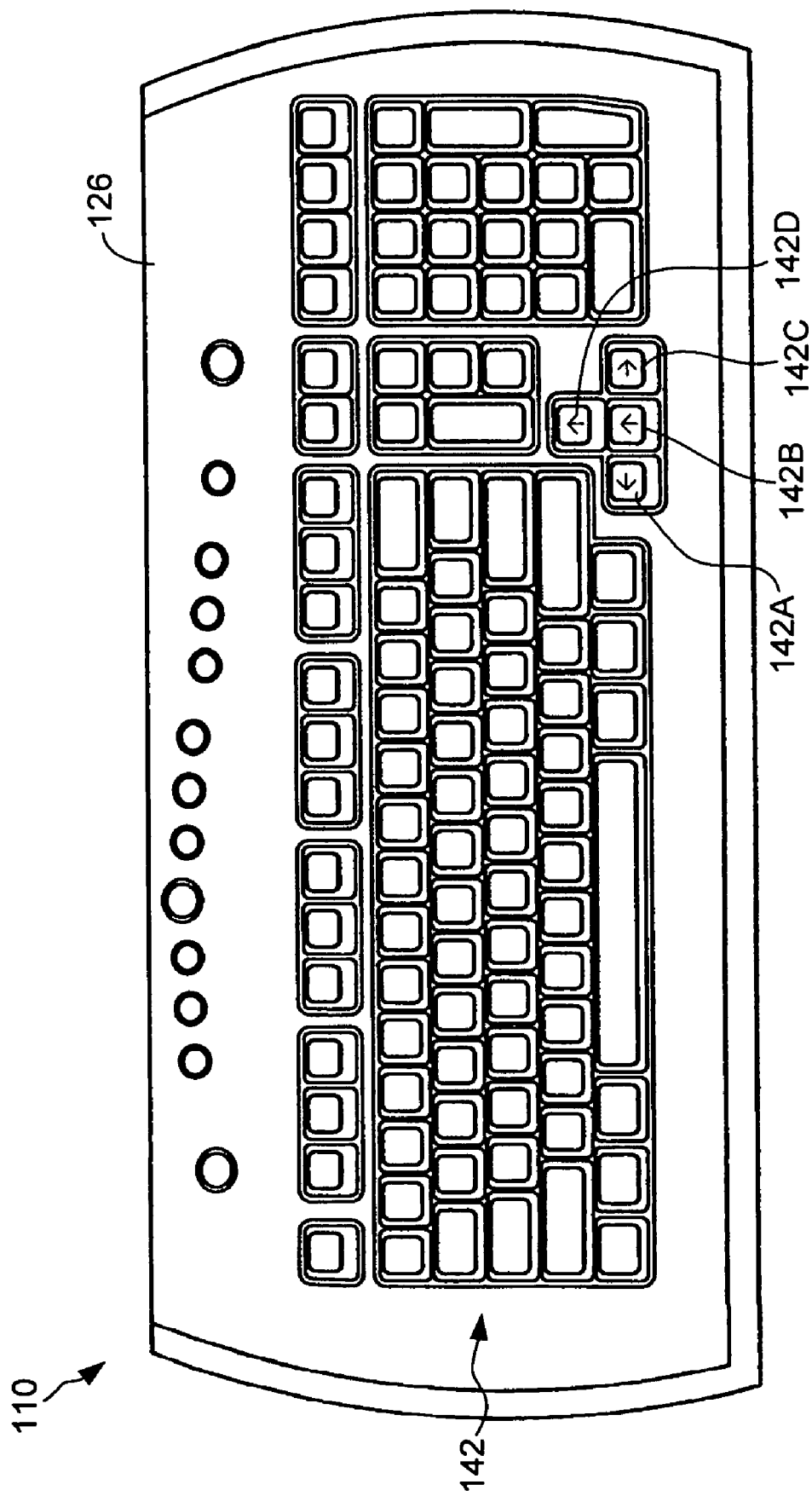
FIG. 4 is a simplified top plan view of a keyboard in accordance with embodiments.

When the control device 110 is a keyboard, such as the keyboard 126 shown in FIG. 4, the up, down, clockwise and counterclockwise movements of the orientation 150 of the character view are performed in response to actuation of separate keys 142, such as the arrow keys 142A-D, for example.

The signals 118 produced by the control device 110 in response to actuations of the control components 128 that result in movements of the orientation 150 of the character view generally provide distance and direction information to the driver program 112 in accordance with conventional methods. The distance and direction information generally comprises a linear count of distance units in the given direction over a unit of time. The driver program 112 translates the distance and direction information from the signals 118 into movement information 184 (FIG. 1) that is used by the microprocessor 116 to move the orientation 150 in the indicated direction in accordance with the video game application 102. For example, when the signals 118 indicate a movement of 20 units of distance in a given direction, the driver program 112 translates the signals 118 such that they can be processed to produce a corresponding rotational movement of the orientation 150 of the character view about the one of the axes 152 and 162 in accordance with the video game application 102.

When the control component 128 is a button, such as an arrow button 142A-D of the keyboard 126 (FIG. 4), the signals 118 produced in response to actuation of the key indicate movement in the given direction, a distance and speed of which is based on each strike of the key and/or the duration of time that the key is pressed. Thus, for example, 5 strikes of the key over a period of one second, or depressing and holding the key for 1 second, may each constitute 5 units of distance to the driver program 112. That distance and speed is then communicated to the microprocessor 116 which rotates the orientation 150 about the corresponding axis 152 or 162 in accordance with the video game application 102.

When the control component 128 corresponds to the components of the mouse 122 that detect travel of the mouse across the surface 171, the signals 118 produced in response to such movement of the mouse 122 indicate distances traveled in the directions 170 or 174 in which the mouse 122 is moved. The signals 118 also provide speed information based on the distance traveled by the mouse 122 per unit of time. Each unit of distance the mouse 122 travels in a given direction 170 or 174 is translated by the driver program 112 into the movement information 184 that moves the orientation 150 of the character view, as presented on the display 106, an amount and direction as determined by the video game application 102.

When the control component 128 is a directional pad 138 or a joystick 140 of the game controller 124, the signals 118 generally indicate a direction in which the pad 138 or joystick 140 is deflected. The amount of the deflection from the quiescent state of the pad 138 or joystick 140 can be used to indicate a speed of the desired movement. The driver program 112 translates the direction, distance and speed of movement indicated by the signals 118 and provides the resultant movement information 184 to the microprocessor 116, which operates to move the orientation 150 in accordance with the video game application 102.

Embodiments are directed to systems, such as control system 108, and methods for allowing a player to calibrate a desired operator-controlled movement of the orientation 150 of the game character view and assign the calibrated movement to a macro button 180 (FIG. 1) of the control device 110.

The calibrated movement is stored by the view change settings 114. Actuation of the macro button 180 then produces the calibrated movement of the orientation 150 of the game character view based on the view change settings 114. Accordingly, embodiments allow a player to actuate the macro button 180 to perform a rotation of the orientation 150 of the character view about the vertical axis 152 (FIG. 6), the horizontal axis 162 (FIG. 7), or both the vertical and horizontal axes 152 and 162. For example, rather than having to move the mouse 122 across the surface 171, pressing a button or key for a period of time or a select number of times, or moving a directional pad 138 or joystick 140 in a given direction for a period of time, the operator only needs to press the macro button 180 to execute the player-operated movement of the orientation 150 as defined by the view change settings 114.

One advantage of this "quick turn" feature is that it reduces the complexity of the controls for the video game by eliminating the need to use the control components 128 to execute a desired movement of the orientation 150. For instance, in fast-paced first-person "shooter" video games, the player must constantly be looking for predator game characters in the game environment including performing 180 degree turns about the vertical axis 152 to see if anyone is lurking behind the game character 144. Embodiments allow the player to set the view change settings 114 such that the game character 144 performs the desired 180 degree turn of the orientation 150 in response to actuation of the macro button 180. The use of the macro button 180 thus frees the player from having to concentrate on making the desired 180 degree rotational movement of the orientation 150 using the control components 128 of the control device 110.

Thus, in one embodiment of the control system 108, the control device 110 includes the macro button 180. Actuation of the macro button 180 produces a macro actuation signal 182 (FIG. 1). The macro button 180 is distinct from the control components 128 that are programmed for use during play of the video game application 102. The driver program 112 produces a view change output 184 (i.e., movement information) in response to the actuation of the macro button 180 and reception of the macro actuation signal 182. The view change output 184 is based on the view change settings 114 stored in the memory 104C. The microprocessor 116 is configured to move the orientation 150 of the character view of the gaming environment 146 from a beginning orientation 186 to an ending orientation 188 based on the view change settings 114 in response to the view change output 184, as illustrated in the simplified plan view of a game character 144 provided in FIG. 8. As used herein, the view change output 184, which is based on the view change settings 114, mirrors the signal or information that would have been generated by the driver program 112 in response to the actuation of the control components 128 of the control device 110 that the player would have performed in order to move the orientation 150 from the beginning orientation 186 to the ending orientation 188. Thus, the amount and direction that the orientation 150 moves in response to the actuation of the macro button 180 is determined, at least in part, by the view change settings 114. Additional embodiments of the control system 108 will be described in combination with embodiments of the method illustrated in FIG. 9.

Figure 9:
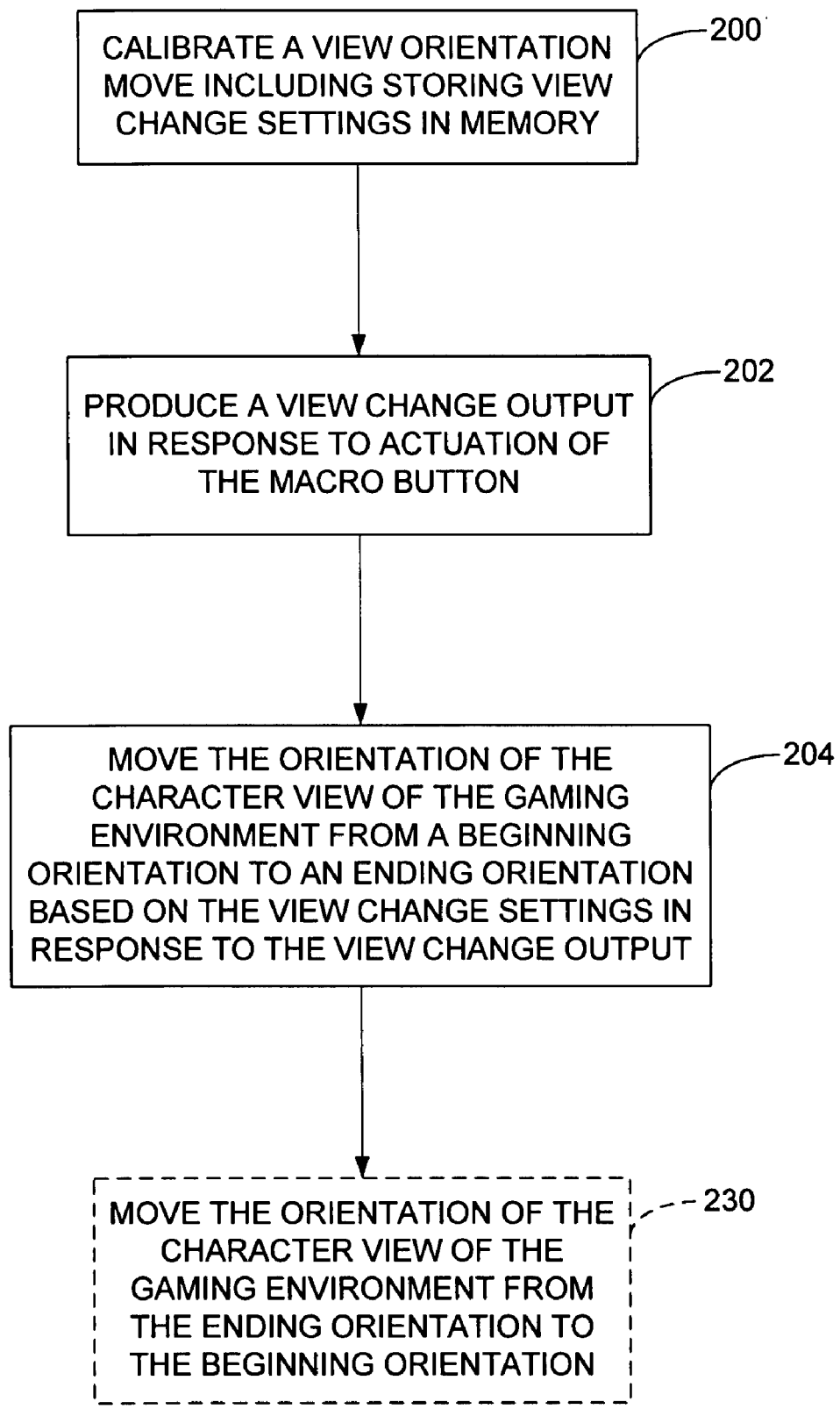
FIG. 9 is a flowchart illustrating a method of using a control system to move an orientation of a character view of a gaming environment in a video game, in accordance with embodiments.

FIG. 9 is a flowchart illustrating a method of using a control system, such as control system 108, to move an orientation 150 of a character view of a gaming environment 146 in a video game, in accordance with embodiments. The method steps are generally performed in response to execution of instructions of the driver program 112 and the video game application 102 respectively stored in the tangible mediums represented by memories 104B and 104A, respectively, by the microprocessor 116.

At step 200, a view orientation move is calibrated including storing the view change settings 114 in memory 104C (FIG. 1). Next, at step 202, the view change output 184 is produced in response to the actuation of the macro button 180 or reception of the actuation output signal 182. The orientation 150 of the character view of the gaming environment 146 is moved, at step 204, from the beginning orientation 186 to the ending orientation 188 based on the view change settings 114 in response to the view change output 184, as mentioned above and illustrated in the simplified plan view of a game character 144 provided in FIG. 8. The movement of the orientation 150 is generally a rotation about an axis 210, as indicated by arrow 211. The direction of the rotation is determined by the view change settings 114.

In one embodiment, the beginning orientation 186 corresponds to the orientation 150 of the character view during game play when the macro button 180 is actuated. The orientation 150 then moves to the ending orientation 188, based on the view change settings 114, during play of the video game 102.

In order to simplify the discussion of the embodiments, the movement of the orientation 150 in accordance with embodiments will be described with reference to rotations about a single axis 210, shown in FIG. 8. The axis 210 represents one or more axes about which the control components 128 of the control device 110 are configured to rotate the orientation 150 of the character view. Thus, the movements described below may alternatively involve a rotation about the horizontal axis 162 alone, or simultaneous rotations about the vertical and horizontal axes 152 and 162, based on the signals 118 produced by the control device 110, for example. Accordingly, in one embodiment of step 204, the axis 210 represents a single axis, which may correspond to the vertical axis 152 (FIG. 6) or the horizontal axis 162 (FIG. 7), about which the orientation 150 moves (i.e., rotates) from the beginning orientation 186 to the ending orientation 188 during step 204 based on the view change settings 114. In another embodiment, the axis 210 represents a combination of the vertical and the horizontal axes 152 and 162, and the orientation 150 moves or rotates from the beginning orientation 186 to the ending orientation 188 about the axis 210 during step 204.

Figure 10:
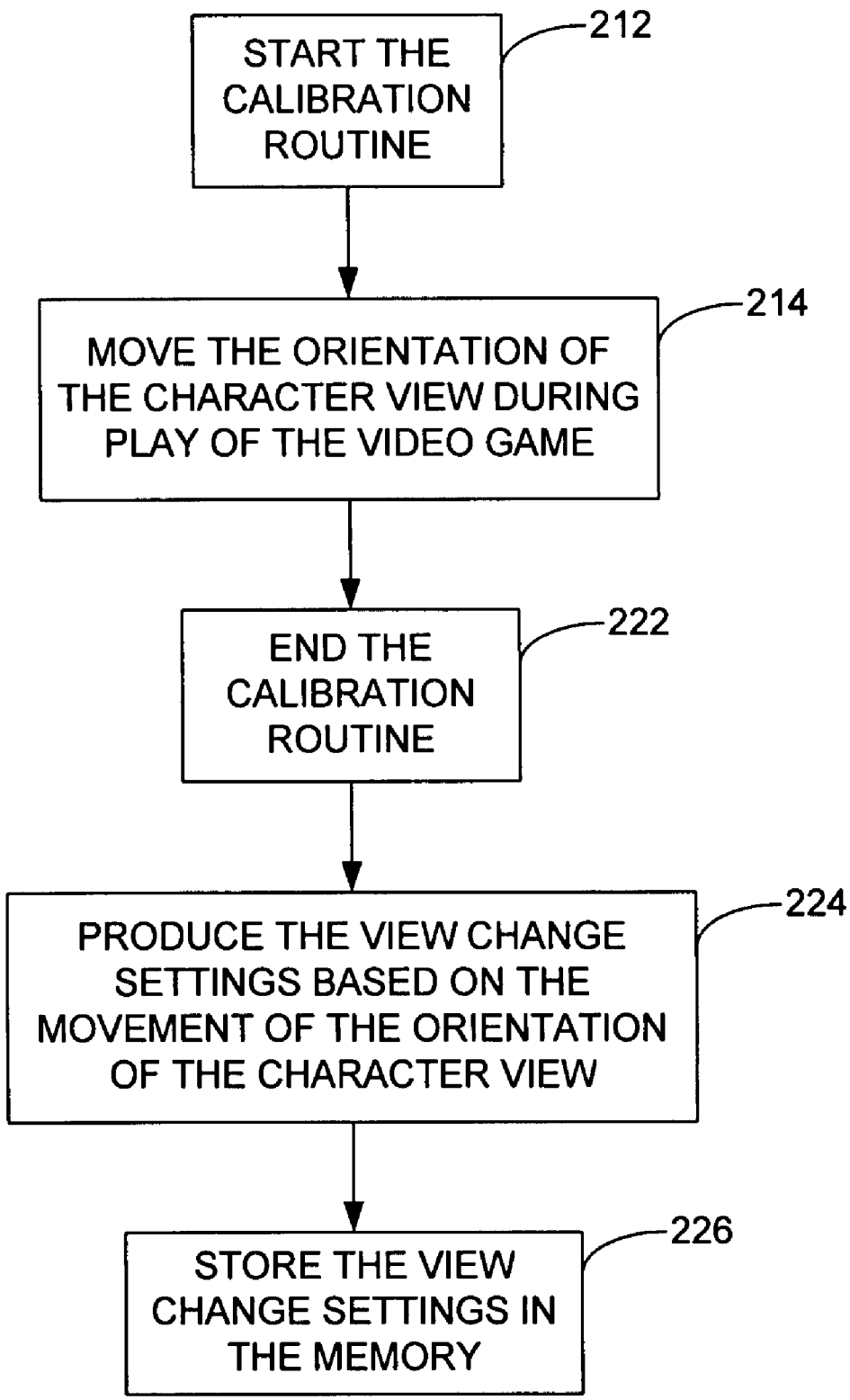
FIG. 10 is a flowchart illustrating embodiments of the calibrating step of the method of FIG. 9.

One embodiment of the calibrating step 200 is illustrated in the flowchart of FIG. 10. At step 212 the calibration routine is started. In one embodiment, the calibration routine is started by pressing and holding the macro button 180 and, after a predetermined period of time, releasing the macro button 180. In one embodiment, the predetermined period of time is approximately one second or more.

In one embodiment, the calibration routine is started during play of the video game 102. Upon starting the calibration routine, the orientation 150 of the character view has a beginning orientation 214, shown in FIG. 11.

Figure 11:
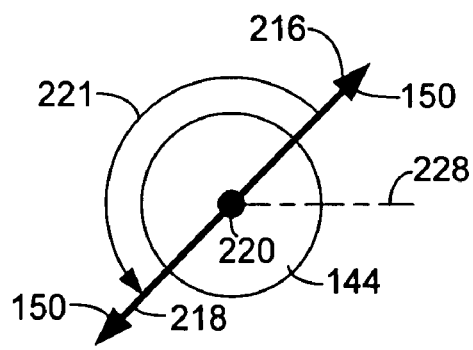
FIG. 11 is a simplified diagram illustrating beginning and ending orientations of a character view during a calibration routine.

At step 214, the orientation 150 of the character view is moved from a beginning orientation 216 to an ending orientation 218 about an axis 220 as indicated by arrow 221 during play of the video game 102, as illustrated in FIG. 11. As discussed above with regard to axis 210, axis 220 can represent one or more axes about which the control components 128 of the control device 110 are configured to rotate the orientation 150 of the character view.

In one embodiment, the movement of the orientation 150 of the character view in step 214 comprises adjusting the orientation 150 of the character view using a control component 128 of the control device 110 that are generally pre-set to perform the desired movement of the orientation 150 during play of the video game 102. Thus, the movement of the orientation 150 of the character view is performed without the use of the macro button 180.

When the control device 110 is in the form of a computer mouse 122 (FIG. 2), the step 214 can be performed using the control components 128 that are traditionally used to move the orientation 150 of the character view. For instance, the movement of the orientation 150 can be performed by moving the mouse 122 across the surface 171 in the direction indicated by arrow 170 and/or 174 to move the orientation 150 of the character view during play of the video game 102 from the beginning orientation 216 to the ending orientation 218, as described above. Other embodiments include moving the orientation from the beginning orientation 216 to the ending orientation 218 using a game controller 124 (FIG. 3) or a keyboard 126 (FIG. 4), as described above.

At step 222, the calibration routine is ended. The ending orientation 218 corresponds to the orientation 150 of the character view upon ending the calibration routine. In one embodiment, the calibration routine is ended by actuating the macro button 180.

At step 224, the view change settings 114 are produced based on the movement of the orientation 150 of the character view in step 214 and the view change settings are stored in the memory 104C at step 226. In one embodiment, the view change settings 114 based on a difference between the beginning orientation 216 and the ending orientation 218. Because the distance and direction information provided by the signals 118 of the control device 110 that correspond to movement of the orientation 150 are generally a linear count of distances units in the given direction over a unit of time, the difference between the first and second orientations can be obtained by simply subtracting the position value of the first orientation from the position value of the second orientation. The sign of the resulting difference indicates the direction in which the orientation 150 was moved. For instance, the beginning orientation 216 and the ending orientation 218 may have a set angular position relative to a reference 228. In that case, the difference between the beginning and ending orientations 216 and 218 is equal to the angular position of the ending orientation 218 relative to the reference 228 less the angular position of the beginning orientation 216 relative to the reference 228.

In one embodiment, the movement of the orientation 150 in step 204 following actuation of the macro button 180 matches the movement of the orientation 150 during the moving step 214. That is the view change settings 114 are set to rotate the orientation 150 from the beginning orientation 186 in response to actuation of the macro button 180 by an amount that matches the difference between the beginning and ending orientations 216 and 218 set during the calibration routine.

In one embodiment of step 214, the player uses the control component 128 of the control device 110 to move the orientation 150 of the character view about the vertical axis 152 approximately 360. This is helpful when it is desired to have the view change settings 114 indicate 180 degrees and other specific angular turns. For instance, during play of a first-person video game, it may be desired to program the macro button 180 to perform a 180 degree turn to allow the game character 144 to quick take a look behind him or her. However, the game environment 146, in which the game character 144 resides, may make it difficult to determine with any real precision a 180 degree turn from the beginning orientation 216 of the calibration routine. By having the player move the orientation 150 a full 360 degrees from the beginning orientation 216 of the calibration routine, the view change settings 114 can be set to one half the measured movement during the calibration routine to more precisely set the desired 180 degree turn.

In accordance with another embodiment, the view change settings 114 are set such that the movement of the orientation 150 in the moving step 204 does not match the difference between the beginning and ending orientations 216 and 218 set during the calibration routine. In one embodiment, the view change settings 114 are set such that the orientation 150 moves a fraction of the difference between the beginning and ending orientations 216 and 218 set during the calibration routine. Embodiments of the fraction include one-fourth, one-half and three-fourths of the difference between the beginning and ending orientations 216 and 218.

Figure 12:
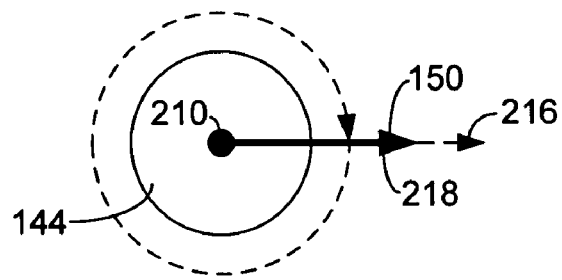
FIG. 12 is a simplified diagram illustrating beginning and ending orientations of a character view during a calibration routine.

In one embodiment, the view change settings 114 are configured to move the orientation 150 one-half of the difference between the beginning and ending orientations 216 and 218 achieved during the moving step 214. This embodiment is particularly useful when it is desired to set the quick turn feature to execute a 180 degree turn upon actuation of the macro button 180 when it is difficult to know the degree to which the orientation 150 of the character view of the game character 144 has rotated from the beginning position 216 during the moving step 214. In accordance with this embodiment, the player rotates the orientation 150 of the character view a full 360 degrees during play of the video game 102 (hereinafter "360 degree calibration"), such that the beginning and ending orientations 216 and 218 are approximately aligned with each other, as illustrated in FIG. 12. The view change settings 114 are then set to move the orientation 150 from the beginning position 186 approximately 180 degrees about the axis 210 to the ending position 188 during the moving step 204 upon actuation of the macro button 180, as illustrated in FIG. 8.

In accordance with another embodiment, following the 360 degree calibration, the view change settings 114 produced in step 224 are configured to move the orientation 150 from the beginning orientation 186 one quarter of the 360 degree calibrated turn or approximately 90 degrees to the ending orientation 188 during the moving step 204. This quarter turn allows the player to take a quick look to the side through actuation of the macro button 180.

In yet another embodiment, following the 360 degree calibration, the view change settings 114 produced in step 224 are configured to move the orientation 150 from the beginning orientation 186 three quarters or approximately 270 degrees to the ending orientation 188 during the moving step 204. This three quarter turn allows the player to look to the opposite side of the game player 144 than that produced by the above-described quarter turn. Alternatively, this three quarter turn can be accomplished using the one quarter turn values for the view change settings 114, but with a change in the designated direction, such that the view 150 is moved in the opposite direction than that of the quarter turn described above.

Figure 8:
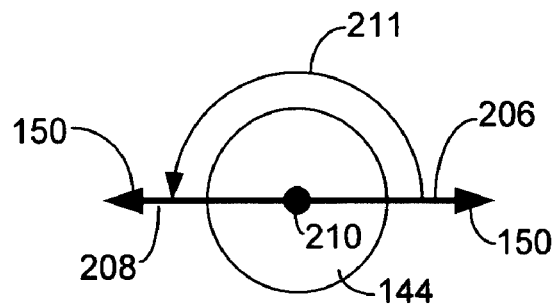
FIG. 8 is a simplified plan view of a game character illustrating movement of an orientation of a character view in accordance with embodiments.

In one embodiment of the method illustrated in FIG. 8, the orientation 150 of the character view is moved from the ending orientation 188 to the beginning orientation 186, at step 230. This generally occurs in response to a view return output contained in the movement information 184 that is generated by the driver program 112. As used herein, the view change output 184 generally mirrors the movement information 184 that would have been generated by the driver program 112 in response to the actuation of the control components 128 of the control device 110 that the player would have performed in order to move the orientation 150 from the ending orientation 188 to the beginning orientation 186.

In one embodiment, the view change output 184 is generated in response to a subsequent actuation of the macro button 180. That is, following a first actuation of the macro button 180, which triggers the moving step 204, a second actuation of the macro button 180 triggers the moving step 230 and the microprocessor 116 moves the orientation 150 from the ending orientation 188 to the beginning orientation 186.

In accordance with another embodiment, the view change output 184 is generated automatically by the driver program 112 after a predetermined period of time following the moving step 204. Thus, after the player initially actuates the macro button 180, the orientation 150 moves from the beginning orientation 186 to the ending orientation 188. Then, after the predetermined period of time, the microprocessor 116 moves the orientation 150 from the ending orientation 188 back to the beginning orientation 186.

In one embodiment, the actuation of the macro button 180 to trigger the moving step 204 comprises pressing and holding the macro button 180. That is, the pressing and holding of the macro button 180 causes the production of the view change output (movement information 184), which in turn causes the microprocessor 116 to move the orientation 150 from the beginning orientation 186 to the ending orientation 188. While the macro button 180 is held, the orientation 150 remains substantially in the ending orientation 188, unless possibly adjusted through actuation of one of the control components 128 of the control device 110. The release of the macro button 180 causes the driver program 112 to produce the view return output (movement information 184) and the microprocessor 116 responds by moving the orientation 150 from the ending orientation 188 to the beginning orientation 186, in accordance with step 230.

Figure 13:
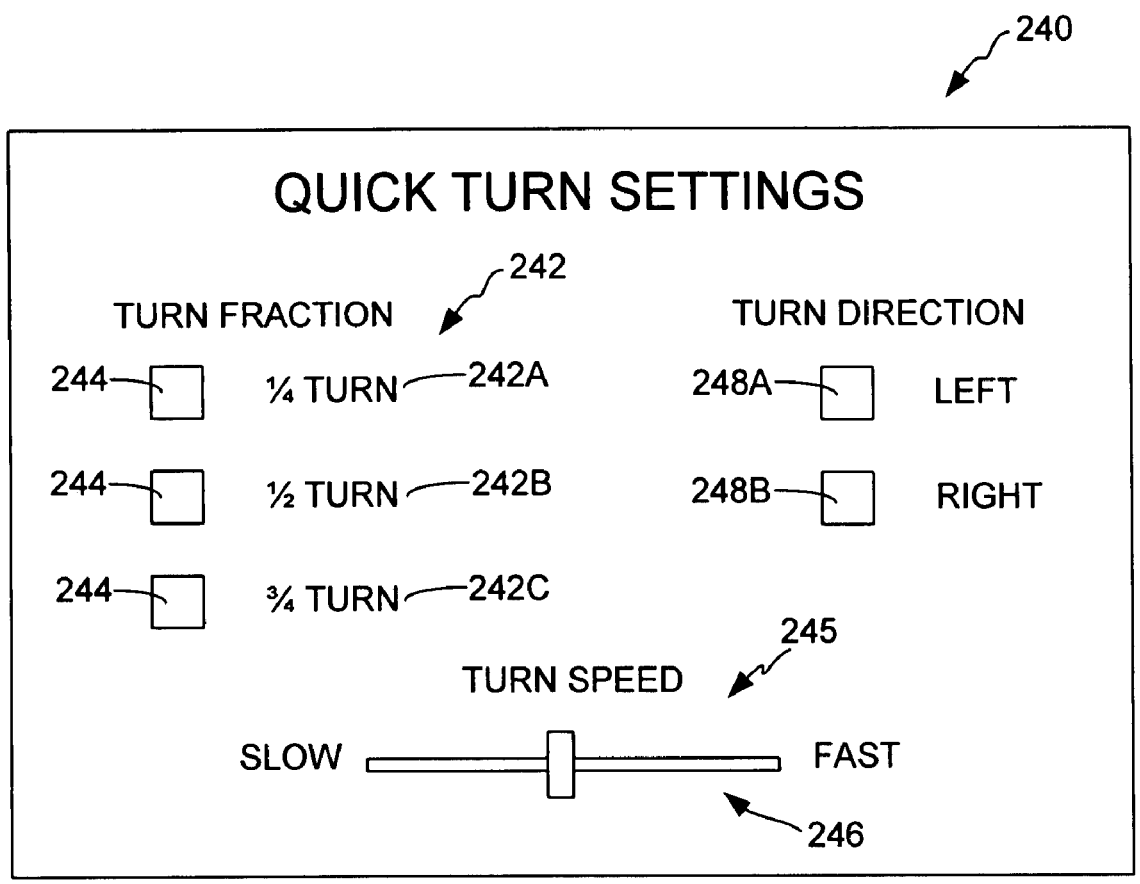
FIG. 13 is a simplified illustration of an exemplary graphical user interface of a driver program in accordance with embodiments.

In accordance with one embodiment, the driver program 112 comprises instructions executable by the microprocessor 116 to generate a graphical user interface, which can be used by the player to configure the quick turn settings. FIG. 13 is a simplified diagram of a graphical user interface 240 in accordance with various embodiments. One embodiment of the interface 240 includes turn fraction settings 242. One embodiment of the turn fraction settings 242 includes one or more fractions of quick turn that was calibrated during the calibrating step 200 (FIG. 9). Exemplary embodiments of the fractions include a one quarter turn 242A, a one half turn 242B, and a three quarters turn 242C. The user may select the desired turn fraction setting 242 by selecting the box 244 adjacent the desired turn. For example, the player performs a 360 degree calibration turn during the calibrating step 200, the player can quickly select whether the quick turn (step 204) that is executed in response to actuation of the macro button 180 will be a 90 degree turn, a 180 degree turn, or a 270 degree turn by selecting the corresponding box 244 in the interface 240.

In accordance with another embodiment, the speed at which the quick turn (step 204) is executed is automatically set to the speed at which it was performed by the player during the calibration routine (step 200). In another embodiment, the speed at which the quick turn (step 204) is executed is automatically set to a predefined value.

In yet another embodiment, the speed at which the quick turn (step 204) is execute is user-selectable. In one embodiment, the graphical user interface 240 includes a turn speed setting 245 where the user may select the desired speed at which the quick turn is performed. In one embodiment, the turn speed setting 245 comprises a slide bar 246 that is adjustable between slow and fast speed settings. Other embodiments include the display of discrete speed settings, such as "slow", "normal" and "fast" (not shown).

In accordance with another embodiment of the invention, the user may select a direction in which the quick turn is performed about the axis 210 (FIG. 8). In one embodiment, the direction options are provided in the graphical user interface 240 where the user may select the quick turn to be performed to the left or counterclockwise direction by selecting box 248A or to the right or clockwise direction by selecting box 248B.

In accordance with one embodiment, the control device 110 includes a plurality of macro buttons, such as macro button 180 and macro button 250, shown in FIG. 1. Each of the macro buttons generally operates in accordance with the embodiments described above.

In one embodiment, the macro buttons 180 and 250 comprise a macro button pair, in which the actuation of the macro button 180 results in the quick turn (steps 202 and 204) to be performed in the clockwise direction about the axis 210 (FIG. 8) and the actuation of the macro button 250 results in the quick turn to be performed in the counterclockwise direction about the axis 210.

In one embodiment, the scroll wheel 134 of the mouse 122 (FIG. 2) operates as a tilt wheel in which it can be moved either left or right, as indicated by arrow 252, about an axis that is approximately in line with arrow 174. The movement of the wheel 134 to the left actuates an interior button 254 and movement of the wheel 134 to the right actuates an interior button 256. In one embodiment, the interior buttons 254 and 256 are designated as a macro button pair. Actuation of the left button 254 triggers the quick turn (steps 202 and 204) to move the orientation 150 from the beginning orientation 186 to the ending orientation 188 in one direction (e.g., left) while the actuation of the right button 256 triggers the quick turn to move the orientation 150 from the beginning orientation 186 to the ending orientation 188 in the opposite direction (e.g., right).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for use in combination with a video game presented on a display, the video game including a character having a character view of a game environment, the character view having an orientation, the system comprising:
   a control device comprising an input mechanism and a selectively reprogrammable macro button, the input mechanism and the selectively reprogrammable macro button being different components of the control device, the input mechanism enabling an end user of the control device to move the orientation of the character view from a beginning orientation to an ending orientation through a manipulation of the input mechanism;
   a reprogrammable memory that stores a difference between the beginning orientation and the ending orientation as a view change setting, the view change setting including a direction of rotation and an amount of rotation;
   a driver program having a view change output that is produced in response to an actuation of the macro button; and
   a microprocessor that moves the orientation of the character view of the game environment in response to the view change output, the orientation of the character view being moved in the same direction of rotation and by the same amount of rotation as stored in the view change setting.

2. The system of claim 1, wherein the view change setting corresponds to rotation about two different rotational axes.

3. The system of claim 1, wherein the input mechanism comprises instructions stored in a tangible medium and executable by the microprocessor to perform a series of steps that include:
   making a record of a series of changes in the orientation of the character view while the series of changes are being made during play of the video game; and
   storing the record of the series of changes in the reprogrammable memory as the view change setting.

4. The system of claim 1, wherein:
   the driver program automatically produces a view return output after a determined expiration of a predetermined period of time starting after said actuation of the macro button; and
   the microprocessor responds to said production of the view return output by automatically moving the orientation of the character view.

5. The system of claim 1, wherein:
   the driver program automatically produces a view return output in response to a subsequent actuation of the macro button; and
   the microprocessor responds to said production of the view return output by automatically moving the orientation of the character view.

6. The system of claim 1, wherein:
   said actuation of the macro button comprises pressing the macro button and holding it in a pressed down position;
   the driver program produces a view return output in response to a release of the macro button out of the pressed down position; and
   the microprocessor responds to the view return output by automatically moving the orientation of the character view in response to the view return output.

7. The system of claim 1, wherein the control device comprises a computer mouse.

8. The system of claim 7, wherein the macro button comprises a tilt wheel.

9. The system of claim 1, wherein the control device is selected from the group consisting of a keyboard and a game controller.

10. A method of using a control system to move an orientation of a character view of a game environment in a video game, the method comprising:
    moving a control input mechanism of a control device along multiple axes of rotation to selectively calibrate a view orientation move;
    determining a direction of rotation and an amount of rotation associated with the view orientation move for each of the multiple axes of rotation;
    storing the directions of rotation and the amounts of rotation in a memory as a view change setting;
    producing a view change output in response to an actuation of a macro button of the control device; and
    responding to the view change output by moving the orientation of the character view of the game environment in the directions of rotation and by the amounts of rotation as defined within the view change setting.

11. The method of claim 10, wherein selectively calibrating the view orientation move further comprises:
    starting a calibration routine;
    adjusting the orientation of the character view during play of the video game;

ending the calibration routine; and producing the view change setting based on the movement of the orientation of the character view during the calibration routine.

12. The method of claim 11, wherein starting the calibration routine comprises pressing and holding the macro button and, after a predetermined period of time, releasing the macro button.

13. The method of claim 12, wherein ending the calibration routine comprises actuating the macro button.

14. The method of claim 11, wherein:

the control device comprises a computer mouse; and adjusting the orientation of the character view comprises moving the mouse across a surface.

15. The method of claim 11, wherein:

the orientation of the character view is based on a game character's head orientation; and the view change setting corresponds to a change in the head orientation; and moving the orientation of the character view of the game environment comprises moving the head orientation of the character.

16. The method of claim 10, wherein the amount of rotation about at least one of the multiple axes of rotation is greater than ninety degrees.

17. The method of claim 10, and further comprising:

automatically returning the orientation of the character view of the game environment to the previous orientation after a predetermined period of time.

18. The method of claim 10, and further comprising:

returning the orientation of the character view of the game environment to the previous orientation in response to a subsequent actuation of the macro button.

19. A control system for use in combination with a video game including a character view of a game environment having an orientation, the system comprising:

a control device comprising a macro button;

a memory;

a microprocessor; and a driver program comprising instructions stored in a tangible medium and executable by the microprocessor to perform steps of:

generating a user interface that enables an end user of the control device to select a speed, a direction, and a fraction of a rotation for a view change setting;

storing the view change setting in the memory; and moving the orientation of the character view of the game environment from a beginning orientation to an ending orientation based on the view change setting in response to an actuation of the macro button.

* * * * *